United States Patent
Pagiamtzis et al.

(10) Patent No.: US 8,560,927 B1
(45) Date of Patent: Oct. 15, 2013

(54) MEMORY ERROR DETECTION CIRCUITRY

(75) Inventors: Kostas Pagiamtzis, Burlington (CA); David Lewis, Toronto (CA)

(73) Assignee: Altera Corporation, San Jose, CA (US)

( * ) Notice: Subject to any disclaimer, the term of this patent is extended or adjusted under 35 U.S.C. 154(b) by 294 days.

(21) Appl. No.: 12/869,666

(22) Filed: Aug. 26, 2010

(51) Int. Cl.
*H03M 13/00* (2006.01)

(52) U.S. Cl.
USPC ........... 714/785; 714/704; 714/746; 714/763; 714/766; 714/767

(58) Field of Classification Search
USPC .................. 714/704, 746, 763, 766, 767, 785
See application file for complete search history.

(56) References Cited

U.S. PATENT DOCUMENTS

| | | | | |
|---|---|---|---|---|
| 5,491,702 | A * | 2/1996 | Kinsel ........................... | 714/753 |
| 5,781,918 | A * | 7/1998 | Lieberman et al. ............... | 711/5 |
| 5,953,351 | A * | 9/1999 | Hicks et al. .................... | 714/763 |
| 5,974,576 | A * | 10/1999 | Zhu .............................. | 714/704 |
| 7,143,332 | B1 | 11/2006 | Trimberger | |
| 7,653,862 | B2 * | 1/2010 | Hassner et al. ............... | 714/767 |
| 8,055,975 | B2 * | 11/2011 | Lilly et al. .................... | 714/758 |
| 2003/0007408 | A1 * | 1/2003 | Lien et al. ..................... | 365/222 |
| 2004/0177309 | A1 * | 9/2004 | Kreso .......................... | 714/763 |
| 2005/0125695 | A1 * | 6/2005 | Gilbert et al. ................. | 713/201 |
| 2006/0200727 | A1 * | 9/2006 | Akiyama et al. .............. | 714/763 |
| 2007/0061684 | A1 * | 3/2007 | Rosenbluth et al. .......... | 714/766 |
| 2008/0320368 | A1 * | 12/2008 | Izumita et al. ................ | 714/763 |
| 2010/0083065 | A1 * | 4/2010 | Longwell et al. ............. | 714/746 |
| 2011/0103400 | A1 * | 5/2011 | Wezelenburg et al. ....... | 370/474 |

OTHER PUBLICATIONS

Ngo, U.S. Appl. No. 12/608,835, filed Oct. 29, 2009.
Ngo, U.S. Appl. No. 11/436,967, filed May 16, 2006.
Tan, Jun Pin, et al., U.S. Appl. No. 12/814,713, filed Jun. 14, 2010.
Dutta, Avijit, et al., "Multiple Bit Upset Tolerant Memory Using a Selective Cycle Avoidance Based SEC-DED-DAEC Code," IEEE VLSI Test Symposium, 2007.

* cited by examiner

*Primary Examiner* — Sam Rizk
(74) *Attorney, Agent, or Firm* — Treyz Law Group; Jason Tsai; Michael H. Lyons

(57) ABSTRACT

Integrated circuits with memory elements may be provided. Integrated circuits may include memory error detection circuitry that is capable of correcting single-bit errors, correcting adjacent double-bit errors, and detecting adjacent triple-bit errors. The memory error detection circuitry may include encoding circuitry that generates parity check bits interleaved among memory data bits. The memory error detection circuitry may include decoding circuitry that is used to generate output data and error signals to indicate whether a correctable soft error or an uncorrectable soft error has been detected. The output data may be written back to the memory elements if a correctable soft error is detected. The memory error detection circuitry may be operable in a pipelined or a non-pipelined mode depending on the desired application.

16 Claims, 10 Drawing Sheets

FIG. 3

MEMORY ERROR DETECTION CIRCUITRY

BACKGROUND

This relates to integrated circuits and more particularly, to circuitry for detecting soft errors in integrated circuits with memory elements.

Integrated circuits often include memory elements that are based on random-access memory (RAM) cells. For example, integrated circuits often include memory elements such as static random-access memory (SRAM) cells, configuration random-access memory (CRAM) cells (e.g., cells that are loaded with configuration data to provide static output signals to programmable circuitry), etc.

During normal operation, an integrated circuit may be subject to environmental background radiation. Particularly in modern devices that contain large numbers of memory cells, there is a possibility that a radiation strike on a memory cell will cause the memory cell and its neighboring cells to change their states (e.g., a radiation strike may induce multi-bit upsets).

Radiation-induced errors that arise in random-access memory cells are sometimes referred to as soft errors. Soft errors are undesirable, because they can potentially cause device malfunction. One way in which soft errors can be addressed is to change the design of the configuration random-access memory cells. However, changes to the configuration random-access memory cells can introduce undesired circuit complexity and can consume additional circuit real estate.

As the density of memory circuitry on integrated circuits increases, multi-bit upsets in adjacent cells become more frequent. In an effort to counteract multi-bit upsets, error correcting coding (ECC) techniques have been developed. Error detection circuitry implemented using convention error correcting codes are capable of detecting and correcting single-bit errors, detecting double-bit errors, and detecting and correcting adjacent double-bit errors. This type of error correcting code is referred to as a single-error-correcting, double-error-detecting, double-adjacent-error-correcting (SEC-DED-DAEC) code.

The conventional SEC-DED-DAEC code, however, is not capable of detecting triple-bit errors. As a result, other codes have been developed that are capable of detecting and correcting all double-bit errors and detecting all triple-bit errors. A double-error-correcting, triple-error-detecting (DEC-TED) code of this type may be used at the cost of significant overhead.

It would therefore be desirable to be able to provide improved error detection circuitry.

SUMMARY

Integrated circuits may have memory elements coupled to error detection circuitry. The error detection circuitry may be used to monitor (scan) the memory cells for the presence of soft errors.

For example, a programmable integrated circuit may contain one or more arrays of configuration random-access-memory (CRAM) cells. Each array may contain rows and columns of configuration random-access memory cells that are used for storing configuration data. The integrated circuit may also be organized into different logic regions, each logic region having its own set of memory arrays.

Memory cells that are connected to a common address line may collectively be referred to as a "frame." The error detection circuitry may process each frame to scan for soft errors. If desired, a subset of a frame (e.g., a "word") may be successively processed to detect soft errors.

The memory error detection circuitry may be implemented based on a parity check matrix. The parity check matrix may be generated based on an error correcting code (ECC) such as a single-error-correcting, double-error-detecting, double-adjacent-error-correcting, triple-adjacent-error-detecting (SEC-DED-DAEC-TAED) code. Error detection circuitry implemented in this way may therefore be capable of detecting and correcting all single-bit errors, detection and correcting all adjacent double-bit errors, and detecting all adjacent triple-bit errors. If desired, the error detection circuitry may be operable in a pipelined or a non-pipelined mode during error detection mode.

The memory error detection circuitry may include encoder circuitry and decoder circuitry. The encoder circuitry may be used to generate parity check bits. The encoder circuitry may have associated data bits output lines and parity check bit lines (check bit lines). These lines may carry the data bits and check bits between that output of the encoder circuitry and the memory cells of the memory array. The check bit lines that carry the check bits may be interleaved (dispersed) among the data bit lines that carry the data bits. For example, the check bit lines may be interleaved among the data bit lines so that there is only one check bit line (or other small number of check bit lines) interposed between adjacent data bit lines. Using this type of dispersed check bit line arrangement, parity bits may be stored in nonadjacent memory elements in the memory array and device layout may be optimized.

The decoder circuitry may include error generation circuitry that produces error signals. The error signals indicate whether a correctable soft error or an uncorrectable soft error has been detected. The decoder circuitry may also generate output data. The output data may be written back to the corresponding frame to correct the erroneous bits if a correctable soft error has been detected.

Further features of the present invention, its nature and various advantages will be more apparent from the accompanying drawings and the following detailed description.

BRIEF DESCRIPTION OF THE DRAWINGS

FIG. 3 is an illustrative parity check matrix in accordance with an embodiment of the present invention.

DETAILED DESCRIPTION

This relates to integrated circuits with memory elements. Memory elements can be used in any suitable integrated circuits that use memory. These integrated circuits may be memory chips, digital signal processing circuits with memory arrays, microprocessors, application specific integrated circuits with memory arrays, programmable integrated circuits such as programmable logic device integrated circuits in which memory elements are used for configuration memory, or other suitable integrated circuits.

On integrated circuits such as memory chips or other circuits in which memory is needed to store processing data, the memory elements can be used to perform the functions of static random-access memory (RAM) cells and are sometimes referred to as SRAM cells. In the context of programmable integrated circuits, the memory elements can be used to store configuration data and are therefore sometimes referred to in this context as configuration random-access memory (CRAM) cells.

Figure 1:
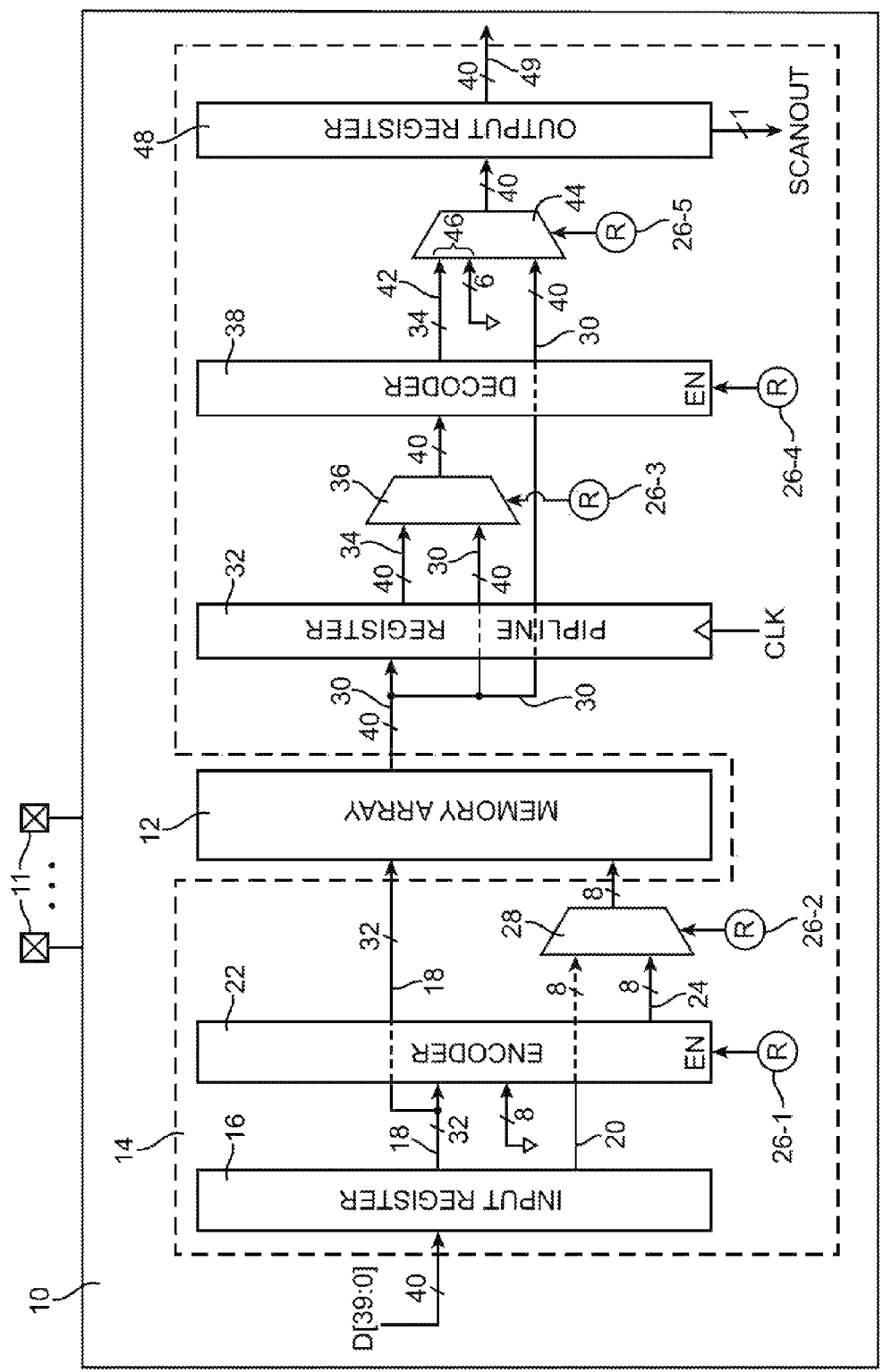
FIG. 1 is a diagram of an illustrative integrated circuit with error detection circuitry in accordance with an embodiment of the present invention.

FIG. 1 shows an integrated circuit that includes a memory array. Memory array 12 on integrated circuit 10 may include memory elements organized in rows and columns. For example, memory array 12 may include hundreds or thousands of memory cells such as SRAM cells, CRAM cells, or other volatile memory elements. If desired, the memory elements on device 10 may be organized using any suitable memory architecture.

Memory cells in array 12 that are loaded with data may be subject to soft errors (e.g., errors induced by strikes from alpha particles and cosmic rays). The change in state of a single memory bit or multiple adjacent memory bits (sometimes referred to as a multi-bit upset) may disrupt the operation of device 10. As a result, device 10 may include error detection circuitry such as error detection circuitry 14 that is used to detect and correct soft errors on device 10 (see, e.g., FIG. 1).

Error detection circuitry 14 may be implemented based on a parity check matrix that is generated using computer-aided design (CAD) tools. The parity check matrix may be associated with an error correcting code (ECC) such as a single-error-correcting, double-error-detecting, double-adjacent-error-correcting, triple-adjacent-error-detecting (SEC-DED-DAEC-TAED) code. Error detection circuitry 14 implemented using this approach may therefore be capable of detecting and correcting all single-bit errors, detection and correcting all adjacent double-bit errors, and detecting all adjacent triple-bit errors.

As shown in FIG. 1, error detection circuitry 14 may include an input register such as input register 16, an encoder such as encoder 22, an input multiplexer such as input multiplexer 28, a pipeline register such as pipeline register 32, a pipeline multiplexer such as pipeline multiplexer 36, a decoder such as decoder 38, an output multiplexer such as output multiplexer 44, and an output registers such as output register 48.

Input register 16 may receive 40 bits of memory data D[39:0] from an off-chip configuration device through input-output pins 11 (as an example). Data D[39:0] may represent data that is to be loaded into a desired group of memory cells. The desired group of memory cells may be arranged along the same column or row and may be collectively referred to as a "frame" (e.g., each memory cell in a frame may be connected to a common address line). If desired, only a subset of a frame may be loaded (e.g., a "word" of memory data bits may be loaded into register 16. The size of input register 16 may vary with the number of data bits in a frame. If desired, a frame may include more or less than 40 data bits, and input register 16 may receive and latch more or less than 40 data bits.

Input register 16 may output a first portion of its data bits (e.g., 32 out of the 40 data bits) to encoder 22 and to memory array 12 over path 18. Input register 16 may output a second portion of its data bits (e.g., the remaining eight data bits out of the 40 data bits) to a first input of multiplexer 28 over path 20. The second portion of the data bits may not be adjacent data bits (e.g., the second portion of the data bits may not be the eight most significant bits in D[39:0], the eight least significant bits in D[39:0], etc.). For example, the second portion of the data bits may include data bits D[1], D[4], D[8], D[9], D[18], D[23], D[30], and D[36] (e.g., the data bits in the second portion are not grouped together).

As shown in FIG. 1, encoder 22 may have a first input that is connected to path 18 (e.g., the first input receives the first portion of data bits from input register 16) and a second input that is connected to a ground power supply line (e.g., a second input is driven to zero volts). If desired, the second input of encoder 22 may be driven to a positive power supply voltage or other voltage levels.

Encoder 22 may have a control input that is connected to a storage element such as storage element 26-1. Storage element 26-1 may be a volatile memory element (e.g., a CRAM cell loaded with configuration data) or a nonvolatile memory element (e.g., a fuse, antifuse, electrically-programmable read-only memory element, etc.). Storage element 26-1 may provide a control bit that is used to enable encoder 22 during error detection mode or to disable encoder 22 during normal operation of device 10. For example, if storage element 26-1 is configured to store a "1," encoder 22 will be enabled to generate parity bits. If storage element 26-1 is configured to store a "0," encoder 22 will be disabled.

During error detection mode, encoder 22 may, for example, generate eight parity bits (sometimes referred to as parity check bits) at its output (output 24). The eight parity bits are redundant bits that are used by decoding circuitry of circuitry 14 to detect soft errors during error detection mode.

Output 24 of encoder 22 may be connected to a second input of input multiplexer 28. Input multiplexer 28 may be controlled by a control bit stored in storage element 26-2 (e.g., a CRAM cell, fuse, antifuse, electrically-programmable read-only memory element, etc.). For example, storage element 26-2 may be loaded with a "1" to configure multiplexer 28 to selectively route the parity bits generated by encoder 22 to memory array 12 during error detection mode. During normal operation, storage element 26-2 may be loaded with a "0" to configure multiplexer 28 to selectively route the data bits from input register 16 directly to memory array 12.

As shown in FIG. 1, memory array 12 may receive data from input register 16 and multiplexer 28. During error detection mode, a selected frame (or word) in memory array 12 may, for example, be loaded with 32 bits of data (e.g., the first portion of data bits provided by input register 16 over path 18) and eight parity bits (e.g., check bits generated by encoder 22 at output 24). During normal operation, the selected frame in memory array 12 may instead be loaded with all data bits D[39:0] stored in input register 16.

Memory data bits (e.g., bits in the selected frame) may be read from memory array 12. The memory data bits may be provided over path 30. Path 30 may be connected to an input of pipeline register 32. Memory array 12 may load the memory data bits from the selected frame into pipeline register 32 over path 30 in parallel. When enabled by clock signal CLK, pipeline register 32 may latch the memory data bits at its input and present them at its output 34.

Pipeline multiplexer 36 may have a first input that is coupled to output 34, a second input that is coupled to path 30, and an output that is coupled to an input of decoder 38. Pipeline multiplexer 36 may serve to act as a block that switches error detection circuitry 14 between a pipelined and non-pipelined mode. Multiplexer 36 may be controlled by a control bit stored in storage element 26-3. For example, storage element 26-3 may be loaded with a "1" to configure multiplexer 36 to selectively route the memory data bits from pipeline register 32 to decoder 38 during error detection mode. Storage element 26-3 may be loaded with a "0" to configure multiplexer 36 to selectively route the memory data bits from the selected frame in memory array 12 directly to decoder 38 (e.g., multiplexer 36 bypasses pipeline register 32 by routing signals from its second input to its output).

A user may operate error detection circuitry 14 in the pipelined mode to achieve higher error detection/correction speed at the cost of power. Operating circuitry 14 in the pipelined mode produces results in two clock cycles (e.g., the pipelined mode incurs a two clock cycle latency), whereas operating circuitry 14 in the non-pipelined mode produces results in one clock cycle.

For example, consider a scenario in which it takes 1.0 ns to read data from a desired frame in memory array 12 and 0.5 ns to perform error detection/correction. If error detection circuitry 14 is operating in the non-pipelined mode, circuitry 14 will experience a latency of 1.5 ns (1.0+0.5) and can therefore be operated at a clock rate of 667 MHz ($1/(1.5*10^{-9})$). If error detection circuitry 14 is operating in the pipelined mode, circuitry 14 will experience a latency of 2 ns (1.0+0.5) but can be operated at a higher clock rate of 1 GHz ($1/(1.0*10^{-9})$), because pipelining buffers memory data so that reading data from memory array 12 and error detection/correction can occur simultaneously. Operating circuitry 14 in the pipelined mode offers higher throughput but lower latency in comparison to the non-pipelined mode.

Decoder 38 may have a control input that is connected to a storage element such as storage element 26-4. Storage element 26-4 may provide a control bit that is used to enable decoder 38 during error detection mode or to disable decoder 38 during normal operation of device 10. For example, if storage element 26-4 is configured to store a "1," decoder 38 will be enabled to generate output data bits (e.g., correct data bits). If storage element 26-4 is configured to store a "0," decoder 38 will be disabled.

During error detection mode, decoder 38 may, for example, generate 34 bits at its output (output 42). The 34 bits generated at the output of decoder 38 may include 32 output data bits and two error bits. The error bits may indicate whether a correctable or uncorrectable error has been detected by circuitry 14. For example, the error bits having logic values of "00" indicates that a currently selected frame exhibits no soft errors, whereas error bits having logic values of "01" indicates that the currently selected frame exhibits a correctable error (e.g., a single-bit error is detected, an adjacent double-bit error is detected, etc.), and whereas error bits having logic values of "11" indicates that the currently selected frame exhibits an uncorrectable error (e.g., an adjacent triple-bit error is detected). It may not be possible for the error signals to have logic values "10" (as an example).

In the scenario in which no soft error is detected, the 32 output data bits generated at output 42 of decoder 38 may be equivalent to the 32 memory data bits received at the input of decoder 38. In the scenario in which a correctable error is detected, the 32 memory data bits received at the input of decoder 38 may include at least one erroneous bit, whereas the 32 output data bits generated at output 42 of decoder 38 may represent correct data bits (e.g., data bits that have been corrected to be equivalent to the original desired data bits presented on path 18). In the scenario in which an uncorrectable error is detected, the 32 output data bits generated at the output 42 of decoder 38 may still exhibit erroneous bits.

Output 42 may be coupled to first input 46 of output multiplexer 44. First input 46 of multiplexer 44 may also receive six additional bits that are at zero volts. If desired, the additional bits may be driven to a high voltage. Multiplexer 44 may have a second input that is coupled to path 30.

Multiplexer 44 may be controlled by a control bit stored in storage element 26-5. For example, storage element 26-5 may be loaded with a "1" to configure multiplexer 36 to selectively route the output data bits from decoder 38 to output register 48 during error detection mode. Storage element 26-5 may be loaded with a "0" to configure multiplexer 44 to selectively route the memory data bits from memory array 12 directly to output register 48 during normal operation.

During error detection mode, data presented at output 49 of output register 48 may optionally be written back to the corresponding frame in memory array 12 to fix the soft errors in response to detecting a correctable soft error. Data may also be scanned out from output register 48 to off-chip test equipment through input-output pins 11. Output register 48 may be a shift register and may be used to provide serial data at output SCANOUT. Information provided at output SCANOUT of output register 48 indicates to a user of device 10 whether a correctable or uncorrectable error has been detected.

Figure 2:
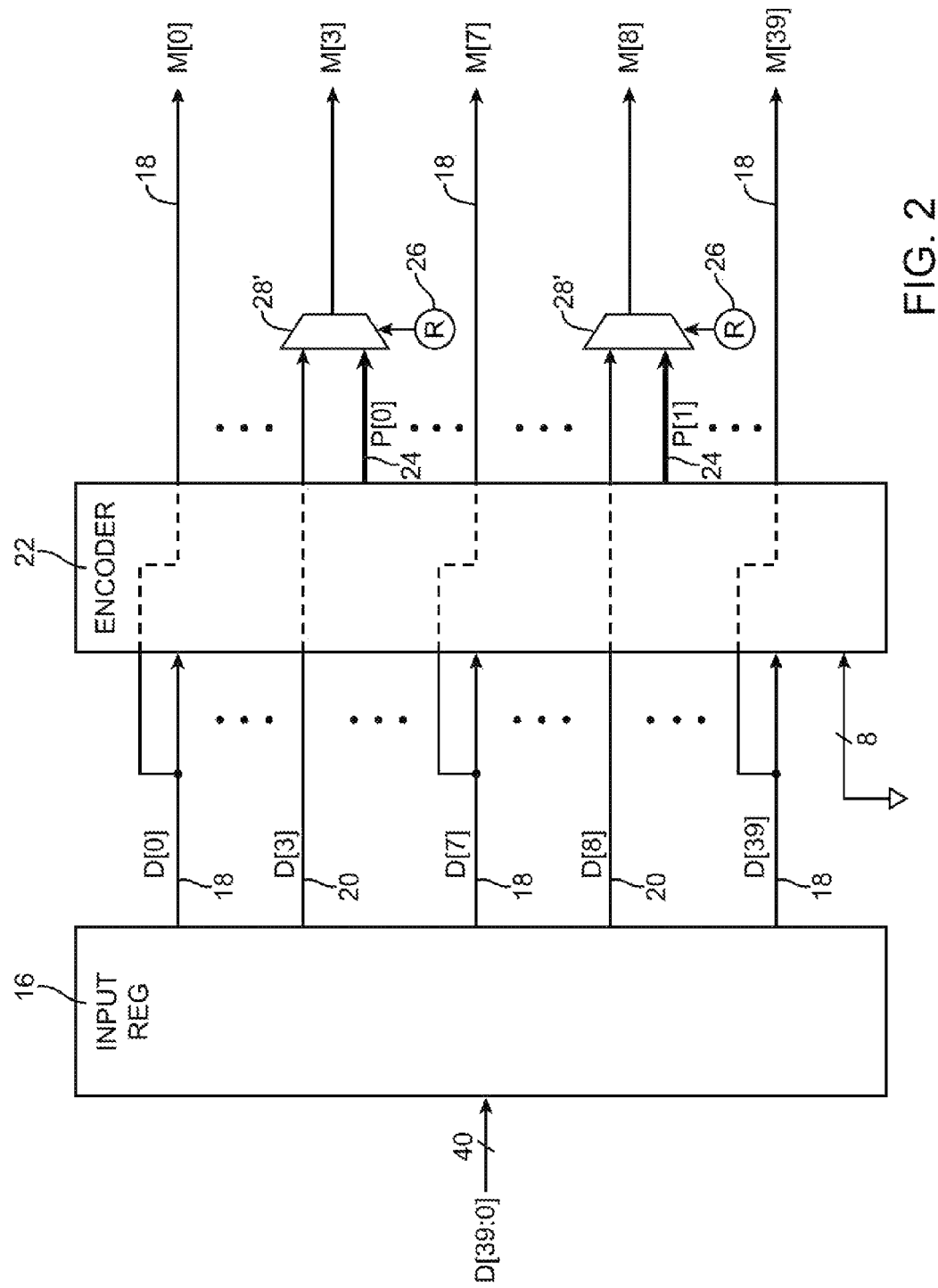
FIG. 2 is a diagram of illustrative encoding circuitry of the error detection circuitry of FIG. 1 in accordance with an embodiment of the present invention.

FIG. 2 shows detailed connections in the encoding circuitry (e.g., input register 16, encoder 22, and multiplexer 28) of error detection circuitry 14. The input of encoder 22 may, for example, receive 32 input data bits (e.g., D[0], D[7], ..., D[39]) over lines 18 from input register 16 and eight additional ground bits. The 32 data bits may be fed directly to corresponding memory cells in the selected frame in memory array 12 (e.g., M[0] corresponds to D[0], M[7] corresponds to D[7], etc.).

Encoder 22 may generate eight parity bits (e.g., parity bits P[0]-P[7]) based on the 32 data bits received at its input. There may be eight input multiplexers 28', each of which has a first input that receives a respective input data bit from register 16 over line 20 and a second input that receives a corresponding parity bit from encoder 22 over line 24 (see, e.g., FIG. 2). For example, first multiplexer 28' may receive data bit D[3] from input register 16 and parity bit P[0] from encoder 22 and may selectively connect one of its inputs to its output to provide data bit M[3].

The eight input data bits received by multiplexers 28' over lines 20 are not fed to encoder 22. The encoding circuitry of circuitry 14 arranged using this configuration may therefore generate 40 data bits M[39:0] (e.g., 32 bits directly from input register 16 and eight bits from eight input multiplexers 28').

The parity bits may not correspond to adjacent memory cells (e.g., the parity bits are interleaved among the data bits). Parity bits spread out in this way allows for less complex routing of wires that connect encoder 22 to memory array 12, because output lines 24 do not have match the wire pitch of corresponding memory cells that receive the parity bits. As a result, the area of the encoding circuitry may be reduced.

Figure 3:
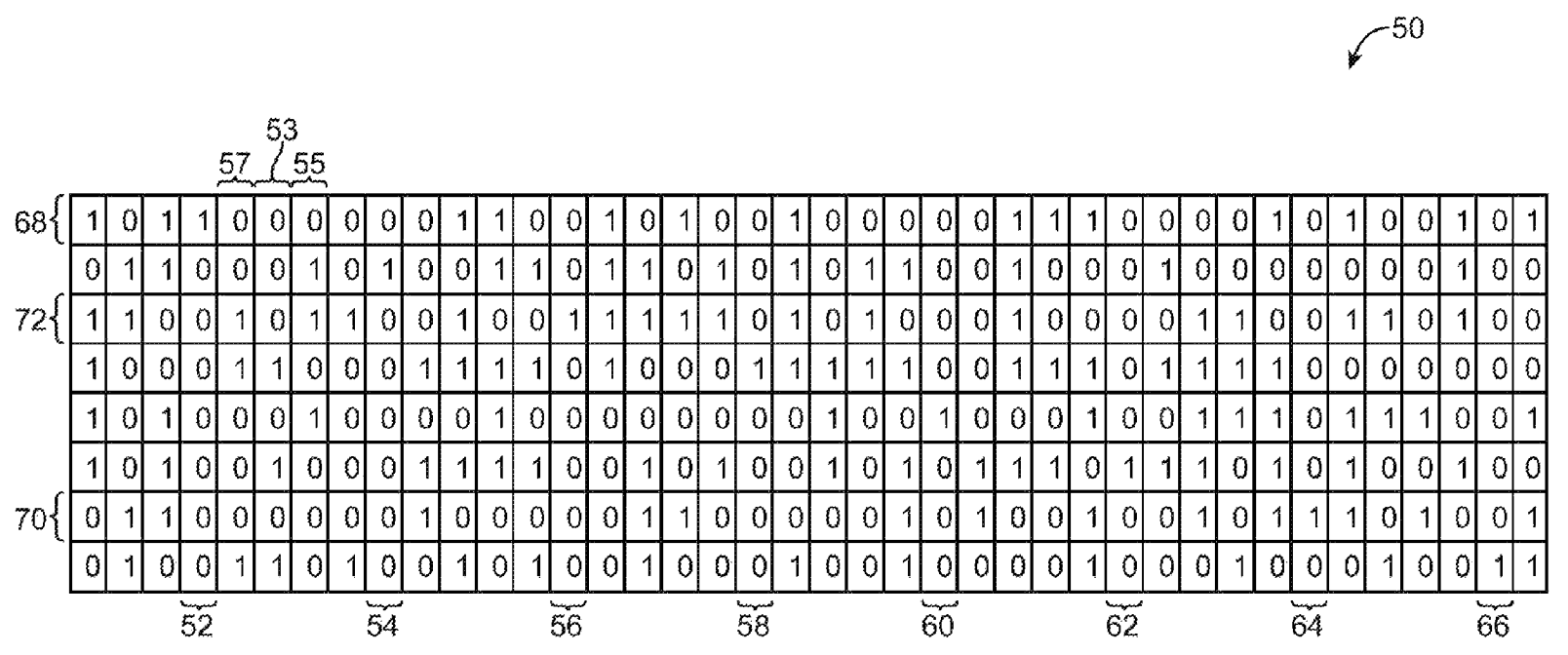

FIG. 3 shows an illustrative parity check matrix such as parity check matrix 50. Parity check matrix 50 may sometimes be referred to as an H Matrix. The implementation and error detection/correction capability of circuitry 14 may be directly dependent on the pattern of bits in matrix 50. Parity check matrix 50 may have eight rows and 40 columns (as an example). In general, the number of rows in parity check matrix 50 may be equal to the number of parity bits used by encoder 22 and decoder 38 of circuitry 14, whereas the number of columns in parity check matrix 50 may be equal to the number of data bits in a selected frame (or word).

The bit positions of the eight parity bits correspond to the eight columns in matrix 50 where there is a single "1." For example, there is a single "1" bit in the third (assuming the leftmost column is the zeroth column (i.e., column 52), the eighth column (i.e., column 54), the thirteenth column (i.e., column 56), and five other columns (i.e., columns 58, 60, 62, 64, and 66), as shown in FIG. 3. As a result, the corresponding eight memory bits M[3], M[8], M[13], . . . , M[38] may be overwritten with parity bits during error detection mode.

An H matrix (e.g., H matrix 50) with the desired properties of distributed check bits and the ability to correct and detect adjacent errors as described above cannot be readily created using conventional techniques. A method for finding a suitable H matrix based on Boolean satisfiability (SAT) can be used. The desired properties of the H matrix are expressed as a set of Boolean equations. A SAT solver running on computing equipment (e.g., a personal computer) can be used to determine if a suitable H matrix exists.

The H matrix may be generated by constructing a Boolean equation for each of the desired properties. The H matrix can be represented by a set of Boolean variables H_i_j where i is a row in the H matrix and j is a column in the H matrix. There may be N check bits and M data/check bits (e.g., the H matrix may have N rows and M columns so that i ranges from 0 to N−1 and j ranges from 0 to M−1).

The notation "ASSIGN(f)," where f is some Boolean formula, indicates that a solution to the set of equations must satisfy the formula f having a true logical value. The SAT solver will find a solution such that the conjunction of all ASSIGNs are true.

The notation "[n,m] (f0, f1, . . . fn)" will be a concise representation of a Boolean formula that is true if and only if at least n but no more than m of the Boolean formulae f0, f1, . . . fn are true. Boolean expressions such as "x :=f" may also be used to associate the name of a formula f with some symbol x;.

The following example will be developed to illustrate the H matrix provided, where N is equal to eight and M is equal to 40. For each of the constraints listed, an example for specific bit positions will be provided. The example only contains a specific instance of the constraint for one specific error combination. A set of constraints must be generated for each possible set of errors.

A first constraint is the desired location of the check bits which may be expressed by a set of ASSIGNs on the check bit locations. For example, to constrain the first check bit in column 3, the following constraints are defined:
ASSIGN (H_0_3);
ASSIGN (not H_1_3);
ASSIGN (not H_2_3);
ASSIGN (not H_3_3);
ASSIGN (not H_4_3);
ASSIGN (not H_5_3);
ASSIGN (not H_6_3);
ASSIGN (not H_7_3);
These constraints can be satisfied if column 3 contains the values 10000000 (see, e.g., FIG. 3).

A second set of constraints can be defined to ensure that each error is detectable and to reduce the logic complexity of the implementation. Each bit must have at least one "1" in the H matrix column, or it will have no effect on any check bit. To reduce implementation complexity, it is desirable to minimize the number of "1's" in the H matrix. Although it is possible to do this directly, doing so would lead to a complex solution. As a result, a simpler approach of constraining the number of "1's" in each column is adopted. Since each "1" corresponds to an input to an XOR tree, minimizing the number of "1's" is desirable. An upper bound, which can be experimentally determined by trying various values, can be included in each column constraint count. For the illustrative H matrix of FIG. 3, it is found that an upper bound of 5 "1's" in each column can be satisfied. This constraint can be expressed as follows, using column 0 as an example.
pop_count_0:=[1,5] (H_0_0, H_1_0, H_2_0, H_3_0, H_4_0, H_5_0, H_6_0, H_7_0);
ASSIGN (pop_count_0);

A third set of constraints ensures that each syndrome associated with any correctable error is different from the syndrome associated with any other correctable error. The syndrome associated with any error is the XOR of the columns associated with the bit position of the error.

The two errors are different if the syndrome is different in any row. For example, consider the adjacent error in bits 13, 14, and a single error in bit 17. The constraint that these two errors produce different syndromes is expressed as:
corr_13_14_v_17:=
(H_13_0 XOR H_14_0 XOR H_17_0) OR
(H_13_1 XOR H_14_1 XOR H_17_1) OR
(H_13_2 XOR H_14_2 XOR H_17_2) OR
(H_13_3 XOR H_14_3 XOR H_17_3) OR
(H_13_4 XOR H_14_4 XOR H_17_4) OR
(H_13_5 XOR H_14_5 XOR H_17_5) OR
(H_13_6 XOR H_14_6 XOR H_17_6) OR
(H_13_7 XOR H_14_7 XOR H_17_7);
ASSIGN (corr_13_14_v_17);

A fourth set of constraints can be generated to express that the syndrome associated with every detectable error is different from the syndrome associated with any correctable error. For example, if errors spanning up to three adjacent bits must be detected, the possible error in bits 17, 18, and 19 must be different from the correctable error in bits 23 and 24:
det_17_18_19_v_23_24:=
(H_17_0 XOR H_18_0 XOR H_19_0 XOR H_23_0 XOR H_24_0) OR
(H_17_1 XOR H_18_1 XOR H_19_1 XOR H_23_1 XOR H_24_1) OR
(H_17_2 XOR H_18_2 XOR H_19_2 XOR H_23_2 XOR H_24_2) OR
(H_17_3 XOR H_18_3 XOR H_19_3 XOR H_23_3 XOR H_24_3) OR
(H_17_4 XOR H_18_4 XOR H_19_4 XOR H_23_4 XOR H_24_4) OR
(H_17_5 XOR H_18_5 XOR H_19_5 XOR H_23_5 XOR H_24_5) OR
(H_17_6 XOR H_18_6 XOR H_19_6 XOR H_23_6 XOR H_24_6) OR
(H_17_7 XOR H_18_7 XOR H_19_7 XOR H_23_7 XOR H_24_7);
ASSIGN (det_17_18_19_v_23_24);

A program can generate the set of four constraints for each possible error or combination of errors. This is input to a Boolean satisfiability solver which will produce as the solution an H matrix that meets the requirements.

Encoder 22 may be used to generate eight parity bits P[7:0]. The particular implementation of encoder 22 depends on the pattern of bits in parity check matrix 50.

Each row in matrix 50 may correspond to the particular implementation of a respective parity bit. Encoder 22 may include eight logic XOR gates that are each used to generate a respective parity check bit. The number of inputs of each XOR gate corresponds to the number of "1's" in each row of the H matrix. For example, a row with 18 or fewer inputs could be implemented with logic gate 80 of FIG. 4.

Figure 4:
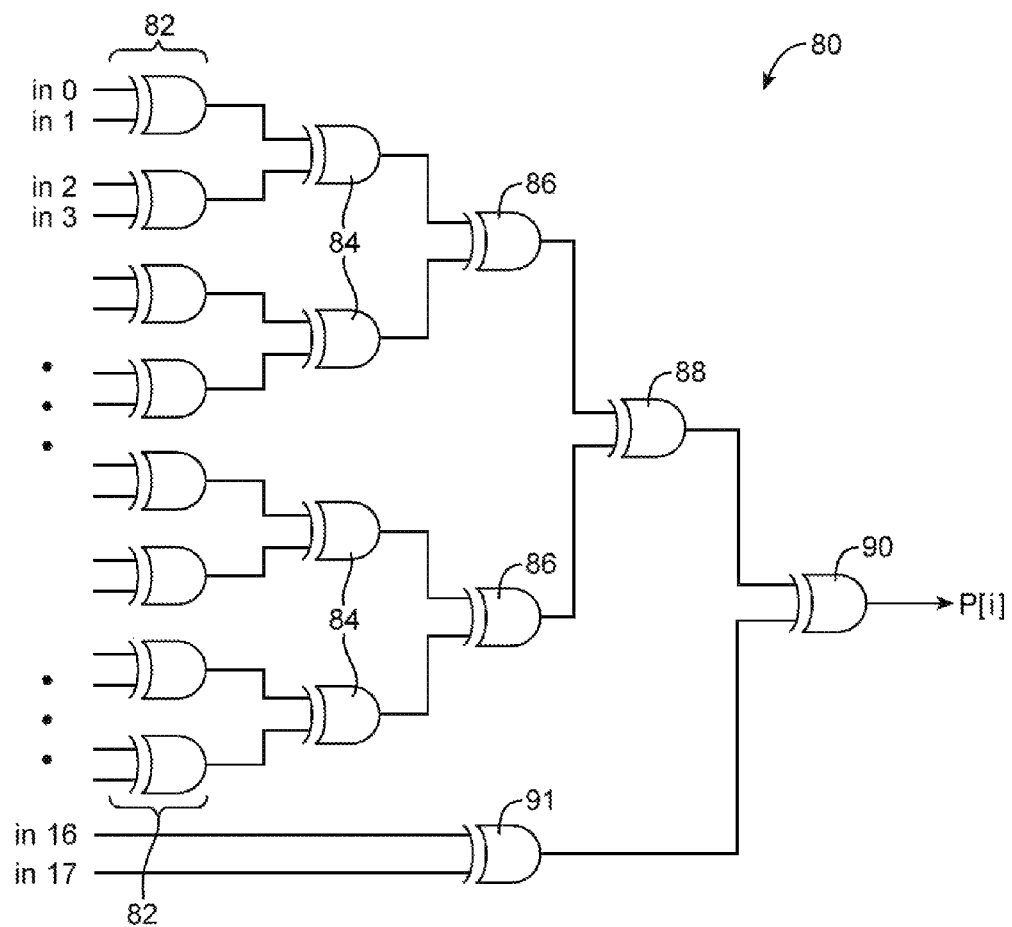
FIGS. 4 and 5 are circuit diagrams showing gate-level implementations of illustrative logic XOR gates in accordance with an embodiment of the present invention.

Four of the eight parity bits may each be generated using a logic XOR gate such as logic XOR gate 80 (FIG. 4). XOR gate 80 may be formed from multiple cascaded two-input exclusive OR gates. As shown in FIG. 4, exclusive OR gate 80 may have inputs in0-in17 (as an example). The inputs of gate 80 may receive up to 18 data bits over path 18 from input register 16. If there is a logic "1" in a particular bit column along a particular row in matrix 50, then the corresponding data bit may be fed to one of the inputs of gate 80.

For example, gate 80 may be used to generate parity bit P[0]. According to row 68 of FIG. 3 (i.e., the row associated with parity bit P[0]), input in0 may be receive D[0] because there is a "1" in the zeroth column of matrix 50, input in1 may receive D[2] because there is a "1" in the second column of matrix 50, . . . , and input in15 may receive D[39] because there is a "1" in the $39^{th}$ column of matrix 50. The unused inputs (i.e., inputs in16 and in17) may be tied to the ground line, if desired.

As another example, gate 80 may be used to generate parity bit P[5]. According to row 70 of FIG. 3 (i.e., the row associated with parity bit P[6]), input in0 may be receive D[1] because there is a "1" in the first column of matrix 50, input in1 may receive D[2] because there is a "1" in the second column of matrix 50, input in2 may receive D[9] because there is a "1" in the ninth column of matrix 50, . . . , and input in13 may receive D[39] because there is a "1" in the $39^{th}$ column of matrix 50. Only 14 of 18 inputs receive data bits from input register 16 in this example. The remaining 4 inputs may receive zero volts.

Logic XOR gate 80 may include eight XOR gates 82, four XOR gates 84, two XOR gates 86, and XOR gates 88, 90, and 91. Each of XOR gates 82, 84, 86, 88, 90, and 91 may be two-input XOR gates. Each XOR gate 82 may have first and second inputs that serve as inputs to gate 80 (e.g., the inputs of first gate 82 serve as in0 and in1, the inputs of second gate 82 serve as in2 and in3, . . . , the inputs of eighth gate 82 serve as in14 and in15).

Each XOR gate 84 may have first and second inputs that are connected to respective outputs of gates 82 (e.g., the inputs of first gate 84 are connected to outputs of first and second gates 82, the inputs of second gate 84 are connected to outputs of third and fourth gates 82, etc.). Each XOR gate 86 may have first and second inputs that are connected to respective outputs of gates 84 (e.g., the inputs of first gate 86 are connected to outputs of first and second gates 84, whereas the inputs of second gate 86 are connected to outputs of third and fourth gates 84). Gate 88 may have first and second inputs that are connected to outputs of first and second gates 86, respectively.

Gate 91 may have first and second inputs that serve as inputs in16 and in 17 to gate 80. Gate 90 may have first and second inputs that are connected to outputs of gates 88 and 91, respectively. Gate 90 may provide the $i^{th}$ parity bit P[i] at its output (see, e.g., FIG. 4).

The configuration of XOR gate 80 as shown in FIG. 4 is merely illustrative. Gate 80 may have more or less than 18 inputs and may be implemented using other gate arrangements, if desired.

Figure 5:
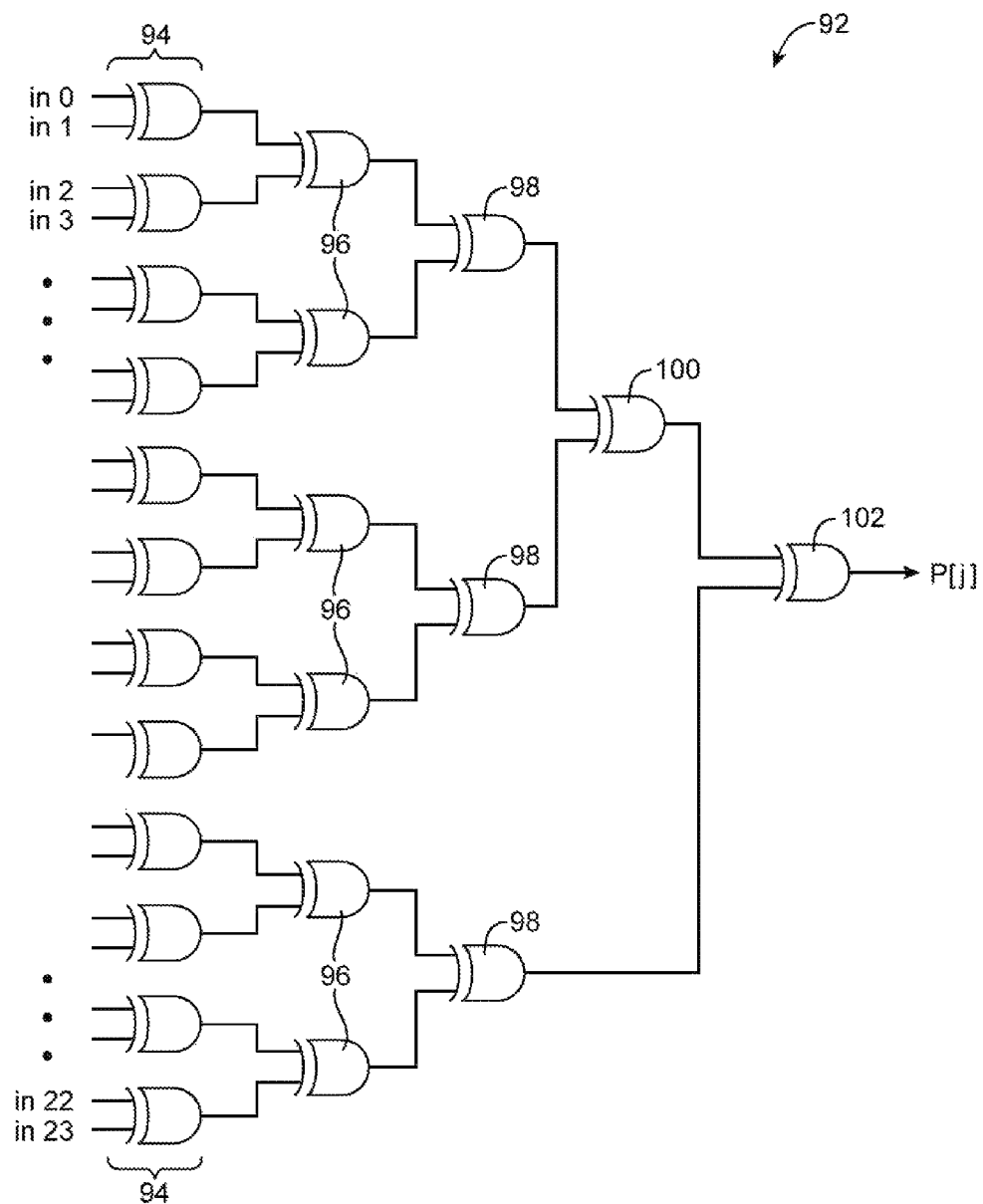

The remaining four of the eight parity bits may each be generated using a logic XOR gate such as logic XOR gate 92 (FIG. 5). Multiple cascaded two-input XOR gates may be used in implementing XOR gate 92 of FIG. 5. As shown in FIG. 5, XOR gate 92 may have inputs in0-in23 (as an example). The inputs of gate 80 may receive up to 24 data bits over path 18 from input register 16. If there is a logic "1" in a particular bit column along a given row in matrix 50, then the corresponding data bit may be fed to one of the inputs of gate 92.

For example, gate 91 may be used to generate parity bit P[7]. According to row 72 of FIG. 3 (i.e., the row associated with parity bit P[2]), input in0 of gate 91 may be receive D[0] because there is a "1" in the zeroth column of matrix 50, input in1 may receive D[1] because there is a "1" in the first column of matrix 50, . . . , and input in18 may receive D[37] because there is a "1" in the $37^{th}$ column of matrix 50. The unused inputs (i.e., inputs in19-in23) may be tied to the ground line, if desired.

Logic XOR gate 92 may include 12 XOR gates 94, six XOR gates 96, three XOR gates 98, and XOR gates 100 and 102. Each of XOR gates 94, 96, 98, 100, and 102 may be two-input XOR gates. Each XOR gate 94 may have first and second inputs that serve as inputs to gate 92 (e.g., the inputs of first gate 94 serve as in0 and in1, the inputs of second gate 94 serve as in2 and in3, . . . , the inputs of $12^{th}$ gate 82 serve as in22 and in23).

Each XOR gate 96 may have first and second inputs that are connected to respective outputs of gates 94 (e.g., the inputs of first gate 96 are connected to outputs of first and second gates 94, the inputs of second gate 96 are connected to outputs of third and fourth gates 94, etc.). Each XOR gate 98 may have first and second inputs that are connected to respective outputs of gates 96 (e.g., the inputs of first gate 98 are connected to outputs of first and second gates 96, whereas the inputs of second gate 98 are connected to outputs of third and fourth gates 96, and whereas the inputs of third gate 98 are connected to outputs of fifth and sixth gates 96).

Gate 100 may have first and second inputs that are connected to outputs of first and second gates 98, respectively. Gate 102 may have first and second inputs that are connected to outputs of gates 100 and third gate 98, respectively. Gate 102 may provide the $j^{th}$ parity bit P[j] at its output (see, e.g., FIG. 5).

The configuration of XOR gate 92 as shown in FIG. 5 is merely illustrative. Gate 92 may have more or less than 24 inputs and may be implemented using other gate arrangements, if desired.

Figure 6:
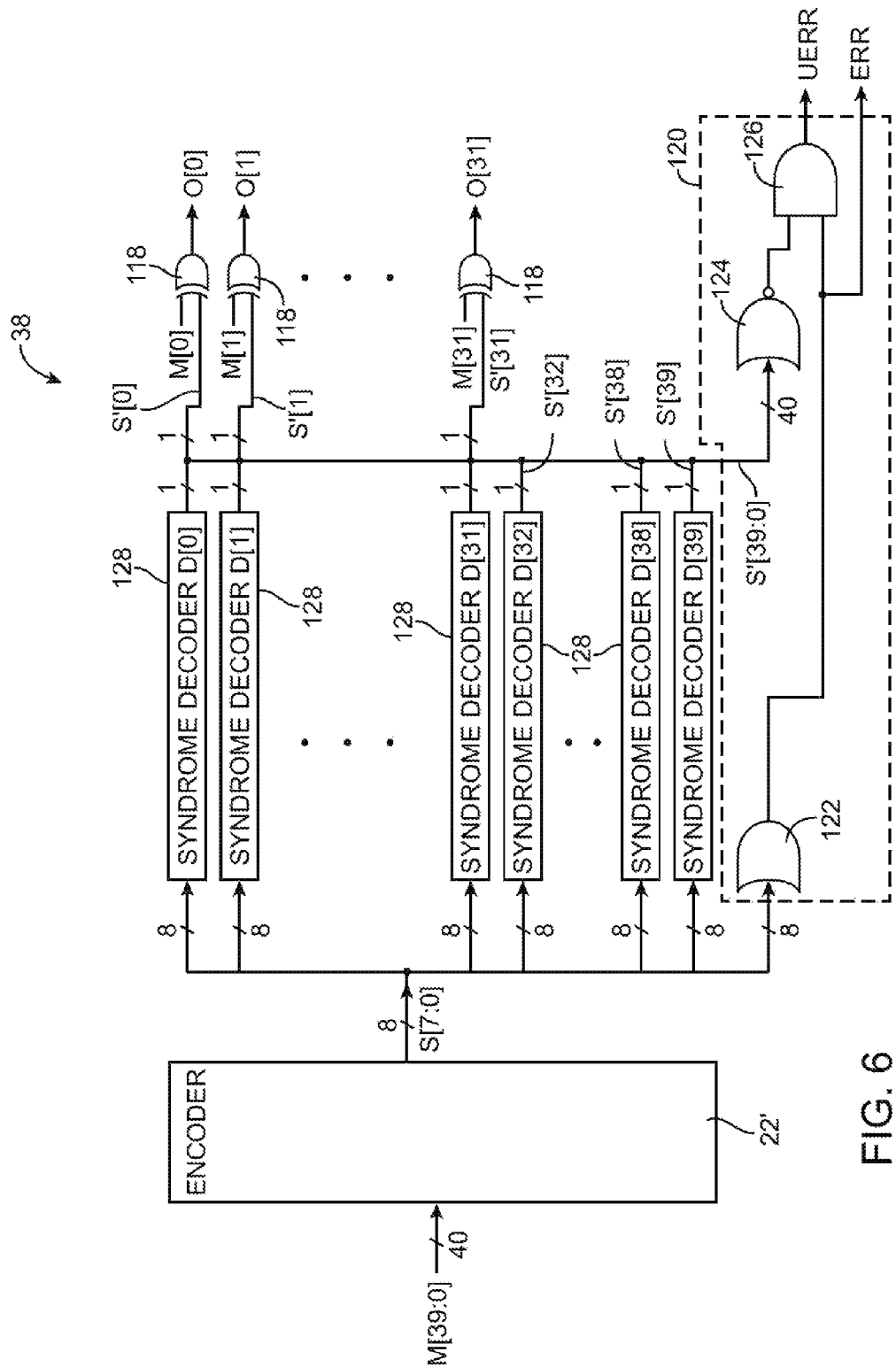
FIG. 6 is a diagram of an illustrative decoder that is part of the error detection circuitry of FIG. 1 in accordance with an embodiment of the present invention.

As shown in FIG. 6, decoder 38 may include a replica of encoder 22 (e.g., a copy of encoder 22 of the type described in connection with FIGS. 1 and 2) such as encoder 22', syndrome decoders such as syndrome decoders 128, logic XOR gates 118, and error generation circuitry such as error generation circuitry 120. Encoder 22' may have the same structure as encoder 22 to reduce design effort. Encoder 22' may, for example, receive memory data bits M[39:0] from the output of multiplexer 36 (see, e.g., FIG. 1) and output eight syndrome (parity) bits S[7:0]. It is desirable to be able to use the same block (structure) for encoder 22 and encoder 22' to reduce design effort. The eight additional input bits in encoder 22 enable encoder 22 and encoder 22' to have the same structure, because encoder 22' receives 40 bits from memory array 12.

Decoder 38 may include 32 syndrome decoders 128 such as syndrome decoders D[0]-D[39]. Syndrome bits S[7:0] may be fed to each of the 32 syndrome decoders and error generation circuitry 120. Each syndrome decoder 128 may generate a corresponding decoded syndrome bit. For example, syndrome decoder D[0] may receive syndrome bits S[7:0] and output decoded syndrome bit S'[0], whereas syndrome decoder D[31] may receive bits S[7:0] and output bit S'[31].

A decoded syndrome bit with a logic value of "1" indicates that the corresponding memory cell bit is erroneous. For example, if S'[1] is high, M[1] has been flipped by a soft error. A syndrome bit with a logic value of "0" indicates that the corresponding memory cell bit is correct. For example, if S'[31] is low, M[31] is correct.

Decoder 38 may include 32 XOR gates 118 (as an example). Each gate 118 may have a first input that receives a respective memory data bit M[i] and a second input that receives a corresponding decoded syndrome bit S'[i]. For example, first gate 118 may have a first input that receives M[0] and a second input that receives S'[0], whereas second gate 118 may have a first input that receives M[1] and a second input that receives S'[1], etc.

Gates 118 may collectively provide output data bits O[31:0]. For example, consider a scenario in which M[23] is erroneously storing a "1." In this scenario, syndrome decoder D[23] will generate S'[23] that is high, and corresponding XOR gate 118 will output bit O[23] with a corrected value of "0." Consider another scenario in which M[14] is correctly storing a "0." In this scenario, syndrome decoder D[14] will generate S'[14] that is low, and corresponding XOR gate 118 will output correct bit O[14] having an unaltered value of "0."

As shown in FIG. 6, error generation circuitry 120 may include logic OR gate 122, logic NOR gate 124 and logic AND gate 126. Gate 122 may have an input that receives syndrome bits S[7:0] from encoder 22' and an output over which error signal ERR is provided. Gate 124 may have an input that receives decoded syndrome bits S'[39:0] from the 40 syndrome decoders D[0]-D[39]. Gate 126 may have a first input that is connected to an output of gate 124, a second input that is connected to an output of gate 122, and an output over which error signal UERR is provided.

Error generation circuitry 120 may be used to generate error signals ERR and UERR. If at least one of syndrome bits S[7:0] is high, then signal ERR will be asserted (e.g., ERR will be raised high) to indicate that some type of error is detected in the currently selected frame (e.g., there may be a single-bit error, a double-bit error, or an adjacent triple-bit error).

NOR gate 124 may output a "1" if all of syndrome bits S[39:0] have logic values of "0." If gates 122 and 124 both output logic "0," signal UERR will be low. If gate 122 outputs a "1" and gate 124 outputs a "0," signal UERR will be low, whereas if gate 122 outputs a "1" and gate 124 outputs a "1" (e.g., syndrome decoders D[0]-D[39] failed to output a single high syndrome bit to indicate an error), signal UERR will be high.

If error signals UERR and ERR are "00," respectively, then the currently selected frame exhibits no soft errors. If error signals UERR and ERR are "01," respectively, then the currently selected frame exhibits a correctable error (e.g., a single-bit error, an adjacent double-bit error, etc.). If error signals UERR and ERR are "10," respectively, then the currently selected frame exhibits an uncorrectable error (e.g., an adjacent triple-bit error). It may not be possible for error signals UERR and ERR to exhibit logic values "10," respectively.

Error signals UERR and ERR and signals 0[31:0] may collectively represent the 34 bits of output signals provided over path 42 of FIG. 1. These bits (padded with six zero bits) may be loaded into output register 48 during error detection mode.

Figure 7:
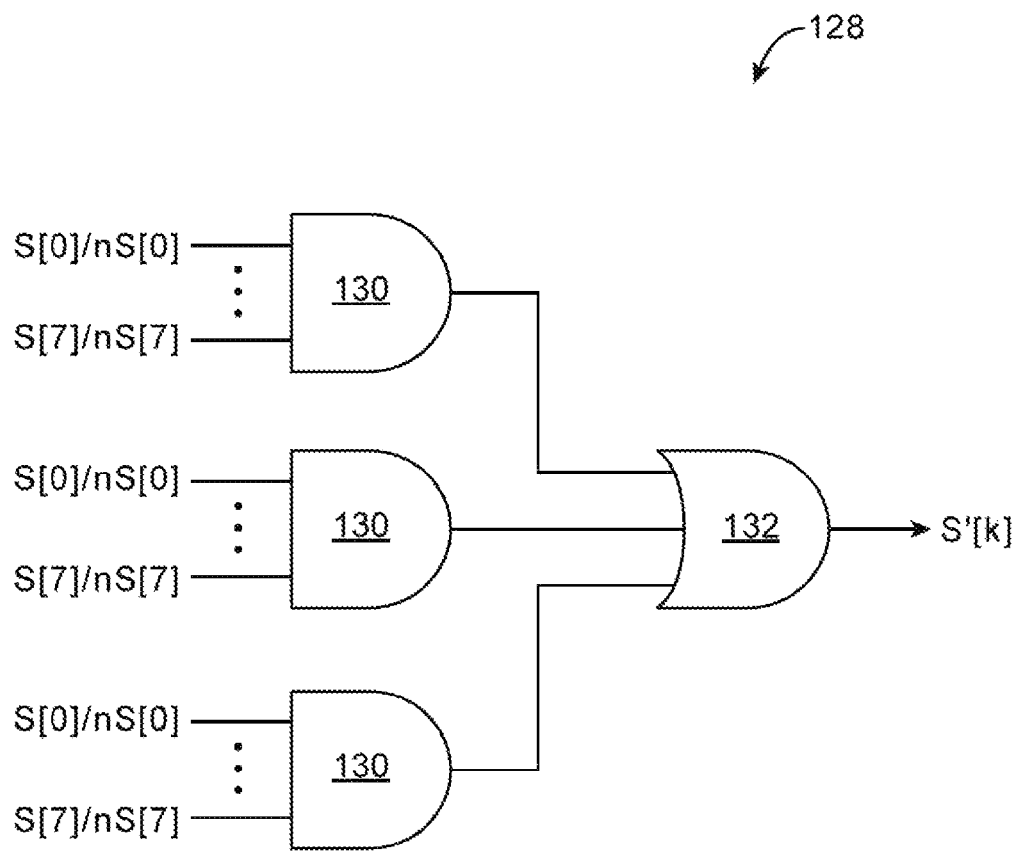
FIG. 7 is a circuit diagram of an illustrative syndrome decoder that is part of the decoder of FIG. 6 in accordance with an embodiment of the present invention.

FIG. 7 illustrates a gate-level implementation of syndrome decoder 128. As shown in FIG. 7, syndrome decoder 128 may include first, second, and third logic AND gates 130 and logic OR gate 132. Each AND gate 130 may have eight inputs (as an example). In general, $k^{th}$ syndrome decoder H[k] has first gate 130 associated with the $k^{th}$ column (assuming the leftmost column is the $0^{th}$ column) of matrix 50, second gate 130 associated with the $k^{th}$ and $(k+1)^{th}$ column of matrix 50, and third gate 130 associated with the $(k-1)^{th}$ and $k^{th}$ column of matrix 50.

First gate 130 of syndrome decoder D[k] may have a first input that is connected to S[0] if corresponding bit H[0,k] (e.g., the corresponding value in the zeroth row and the $k^{th}$ column of matrix 50) is "1" or that is connected to nS[0] (an inverted version of S[0]) if the corresponding bit H[0,k] is "0." The other inputs of first gate 130 may be connected to respective true or inverted versions of the syndrome bits (e.g., S[7:1]) depending on the corresponding values in the $k^{th}$ column of matrix 50.

Second gate 130 of syndrome decoder D[k] may have a first input that is connected to S[0] if the exclusive OR of H[0,k] and H[0,k+1] produces a "1" (e.g., if H[0,k] and H[0,k+1] are different) or that is connected to nS[0] if the exclusive OR of H[0,k] and H[0,k+1] produces a "0" (e.g., if H[0,k] and H[0,k+1] are equal). The other inputs of first gate 130 may be connected to respective true or inverted versions of the syndrome bits (e.g., S[7:1]) depending on the values produced by XOR'ing the corresponding values in the $k^{th}$ and $(k+1)^{th}$ columns of matrix 50.

Third gate 130 of syndrome decoder D[k] may have a first input that is connected to S[0] if the exclusive OR of H[0,k−1] and H[0,k] produces a "1" (e.g., if H[0,k−1] and H[0,k] are different) or that is connected to nS[0] if the exclusive OR of H[0,k−1] and H[0,k] produces a "0" (e.g., if H[0,k−1] and H[0,k] are equal). The other inputs of first gate 130 may be connected to respective true or inverted versions of the syndrome bits (e.g., S[7:1]) depending on the values produced by XOR'ing the corresponding values in the $(k-1)^{th}$ and $k^{th}$ columns of matrix 50.

First gate 130 of syndrome decoder D[k] may produce a first product term that is used to indicate a single-bit error located at the $k^{th}$ position of the selected frame. Second gate 130 of syndrome decoder D[k] may produce a second product term that is used to indicate an adjacent double-bit error starting at the $k^{th}$ position of the selected frame, whereas third gate 130 of syndrome decoder D[k] may produce a third product term that is used to indicate an adjacent double-bit error starting at the $(k-1)^{th}$ position of the selected frame. Second and third gates 130 of decoder D[k] may collectively serve to detect an adjacent triple-bit error starting at the $(k-1)^{th}$ position of the selected frame.

For example, syndrome decoder D[5] may have first gate 130 associated with the fifth column, second gate 130 associated with the fifth and sixth columns, and third gate 130 associated with the fourth and fifth columns. First gate 130 of decoder D[5] may have a first input connected to nS[0] because H[0,5] is low, a second input connected to nS[1] because H[1,5] is low, a third input connected to nS[2] because H[2,5] is low, etc. (see, e.g., column 53 of FIG. 3). Second gate 130 of decoder D[5] may have a first input connected to S[0] because the XOR of H[0,5] and H[0,6] is high, a second input connected to S[1] because the XOR of H[1,5] and H[1,6] is high, a third input connected to S[2] because the XOR of H[2,5] and H[2,6] is high, etc. (see, e.g., columns 53 and 55 of FIG. 3). Third gate 130 of decoder D[5] may have a first input connected to nS[0] because the XOR of H[0,4] and H[0,5] is low, a second input connected to nS[1]

because the XOR of H[1,4] and H[1,5] is low, a third input connected to S[2] because the XOR of H[2,4] and H[2,5] is high, etc. (see, e.g., columns 57 and 53 of FIG. 3).

Logic OR gate 132 may have first, second, and third inputs that are connected to outputs of first, second, and third gates 130, respectively. Gate 132 may have an output over which bit S'[i] is provided. The $i^{th}$ decoded syndrome bit S'[i] is high if at least one of first, second, and third gates 130 outputs a "1."

Figure 8:
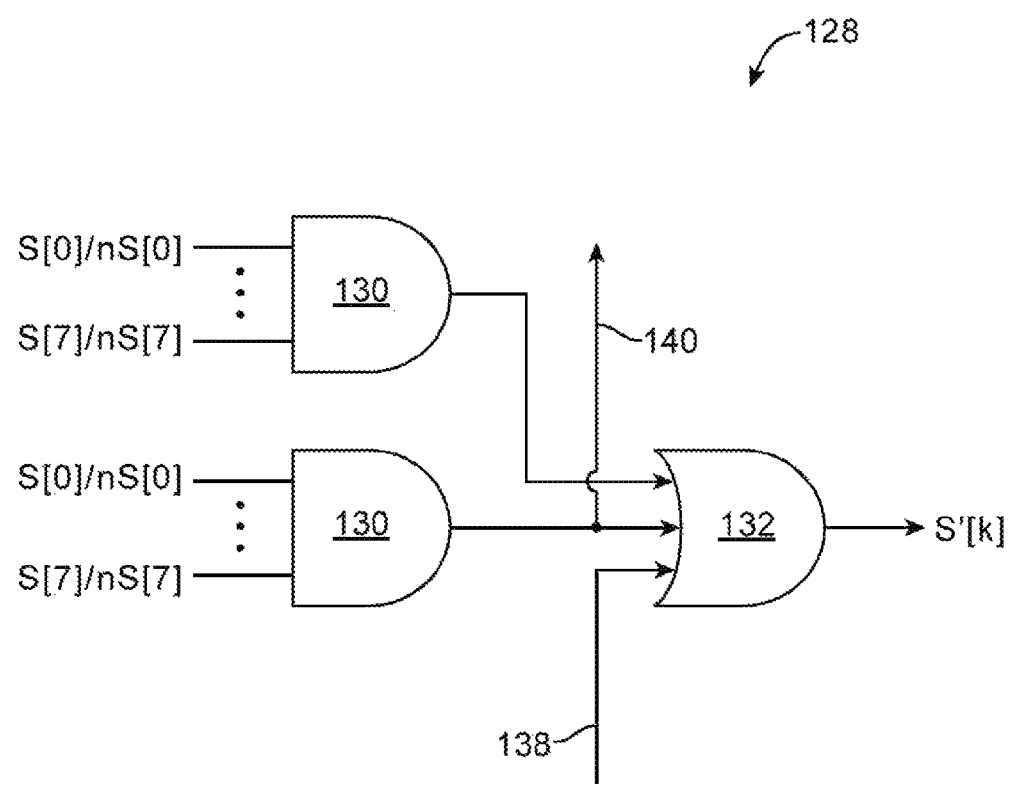
FIG. 8 is a circuit diagram of an illustrative syndrome decoder that uses shared gates in accordance with an embodiment of the present invention.

FIG. 8 shows how the product terms generated at the outputs of gates 130 in each syndrome decoder 128 may be shared between adjacent syndrome decoders 128. As shown in FIG. 8, the second product term generated by second gate 130 in $k^{th}$ syndrome decoder D[k] may be fed to the third input of gate 132 in adjacent syndrome decoder D[k+1] over line 140. The third input of gate 132 of decoder D[k] may receive the second product term generated by second gate 130 in adjacent syndrome decoder D[k−1] over line 138.

For example, syndrome decoder D[24] may have first gate 130 associated with the $24^{th}$ column and second gate 130 associated with the $24^{th}$ and $25^{th}$ columns. Second gate 130 may have an output that is fed to the third input of gate 132 in adjacent syndrome decoder D[25] over line 140. The third input of gate 132 in decoder D[24] may receive a second product term from second gate 130 in adjacent syndrome decoder D[23] over line 138.

Figure 9:
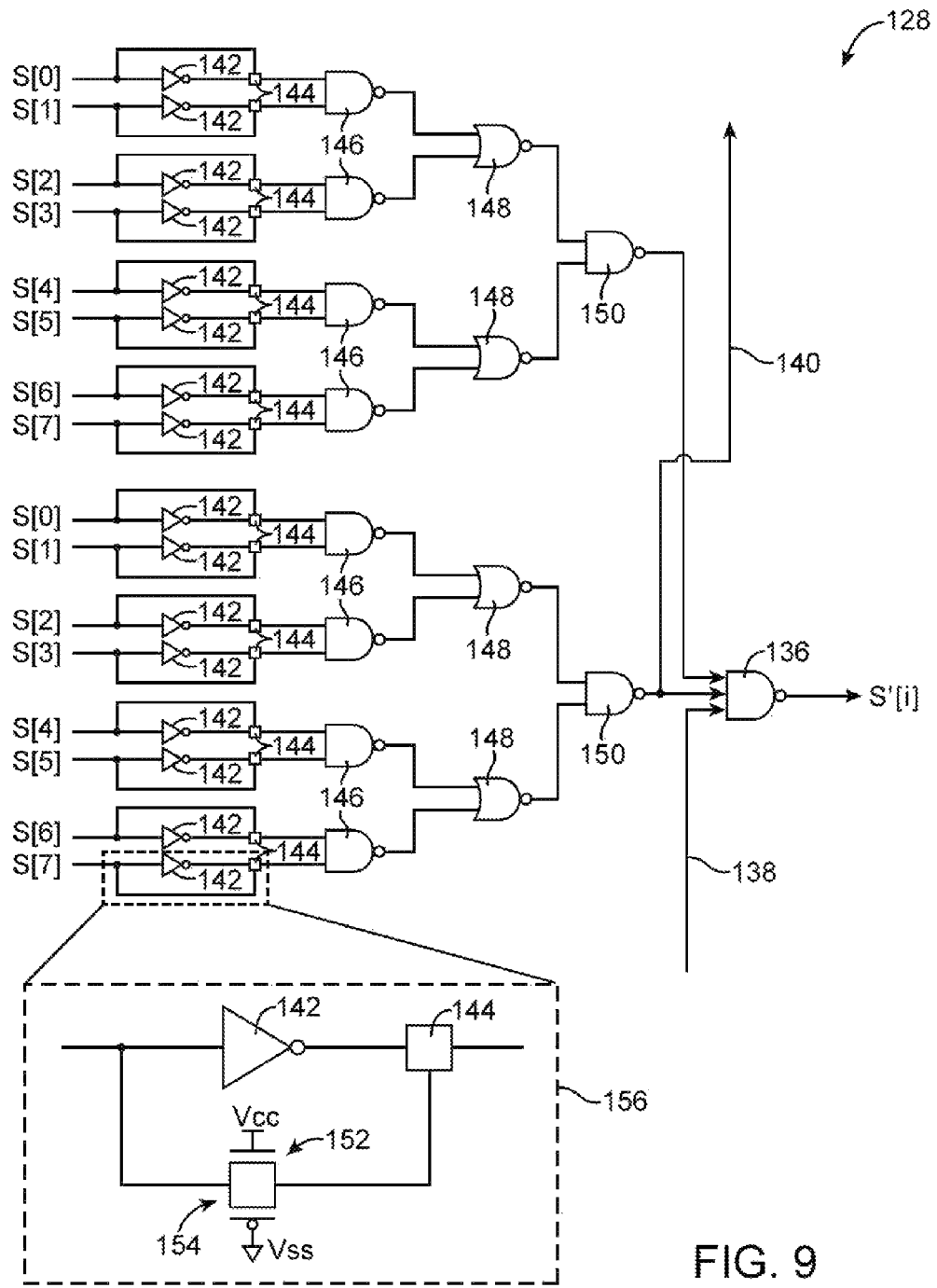
FIG. 9 is a circuit diagram of the syndrome decoder of FIG. 8 showing via programmability and logic balancing in accordance with an embodiment of the present invention.

FIG. 9 shows one suitable circuit arrangement of syndrome decoder 128. Syndrome decoder 128 of FIG. 9 may include logic NAND gates 146, 150, and 136 and logic NOR gates 148. As shown in FIG. 9, true and complementary versions (e.g., the complementary version is generated through inverter 142) of each syndrome bit may be wired towards a corresponding via location 144. If the true version of the syndrome bit is desired, a via may be formed at 144 to connect an input of gate 146 to the wire on which the true syndrome bit is conveyed. If the complementary version of the syndrome bit is desired, a via may be formed at 144 to connect the input of gate 146 to the wire on which the complementary syndrome bit is conveyed. Using via programming in this way allows each syndrome decoder 128 to have identical layout arrangement with different via placements.

Each gate 146 may have first and second inputs that receive true or complementary versions of respective syndrome bits. Each gate 148 may have first and second inputs that are coupled to outputs of an associated pair of gates 146. Each gate 150 may have first and second inputs that are coupled to outputs of an associated pair of gates 148. Gate 136 may have a first input that receives a first product term from first gate 150, a second input that receives a second product term from second gate 150, and a third input that is connected to line 138. Syndrome decoder 138 may therefore incorporate the sharing of product terms, as described in connection with FIG. 8.

As shown in box 156 of FIG. 9, the complementary version of a syndrome bit may be fed through inverter 142, whereas the true version of the syndrome bit may be fed through a dummy transmission (pass) gate (e.g., a transmission gate having n-channel transistor 152 and p-channel transistor 154 connected in parallel). Transistors 152 and 154 may be turned on (e.g., transistor 152 may have a gate that is driven to positive power supply voltage Vcc, whereas transistor 154 may have a gate that is driven to ground power supply voltage Vss). The dummy pass gate may serve to equalize the delay of the true and complementary syndrome bits. Logic balancing implemented in this way prevents downstream logic glitches and reduce dynamic power.

Figure 10:
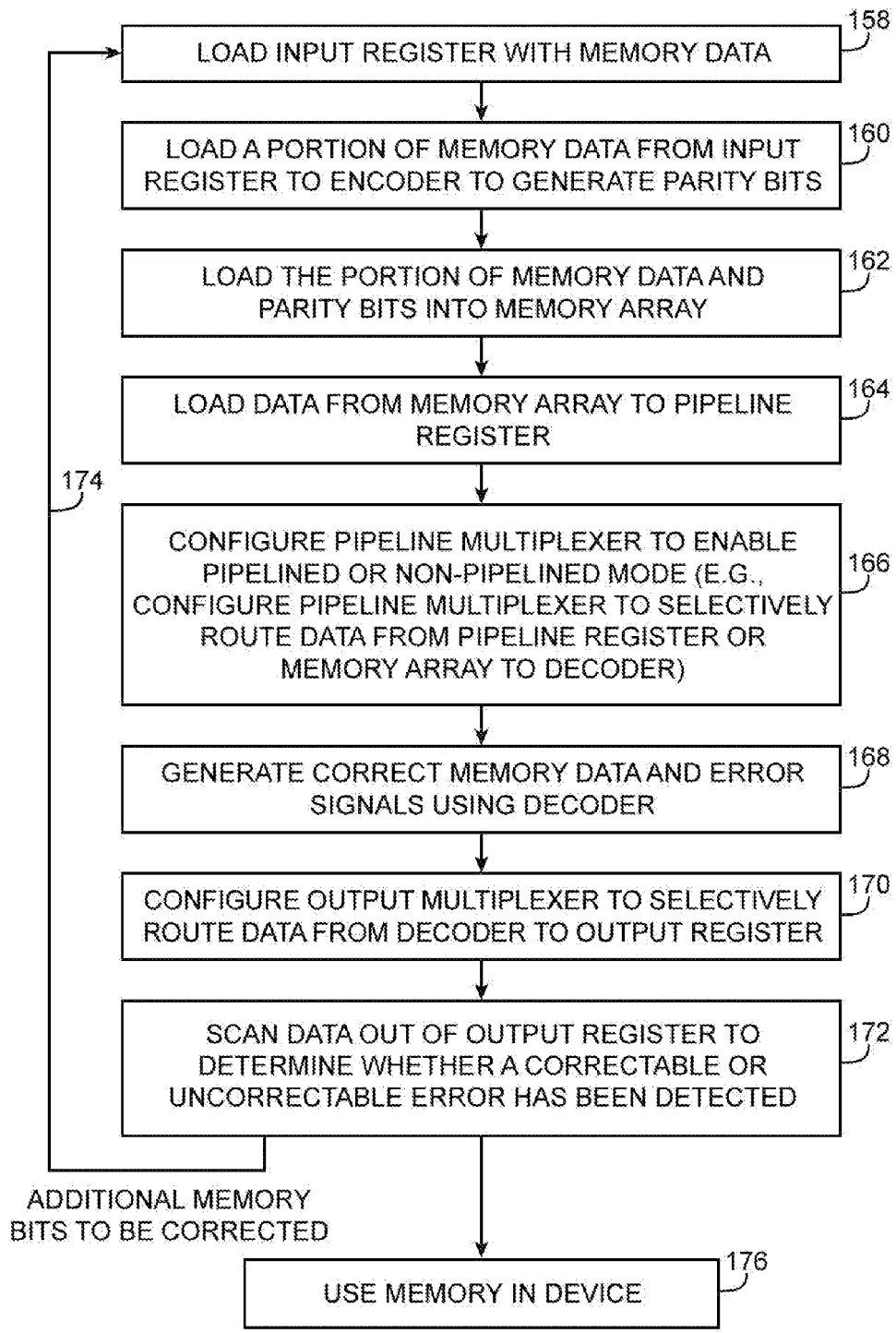
FIG. 10 is a flow chart of illustrative steps involved in operating the error detection circuitry of FIG. 1 in accordance with an embodiment of the present invention.

FIG. 10 shows illustrative steps involved in operating device 10 during error detection mode. At step 158, input register 16 may be loaded with input data (e.g., from an off-chip configuration device). At step 160, encoder 22 may receive a portion of the input data from register 16 to generate parity (check) bits at its output.

At step 162, the portion of input data and the parity bits generated from encoder 22 may be written into a selected frame in memory array 12. At step 164, memory data from array 12 may optionally be latched by pipeline register 32 if error detection circuitry 14 is operating in the pipelined mode. At step 166, pipeline multiplexer 36 may be configured to enable the pipelined mode or the non-pipelined mode (e.g., multiplexer 36 may be configured to selectively route data from pipeline register 36 or memory array 12 to its output).

At step 168, decoder 168 may be used to generate output data and error signals at its output. At step 170, output multiplexer 44 may be configured to selectively route data from decoder 42 to its output during error detection mode.

At step 172, data may be scanned out from output register 48. The error signals may indicate whether a correctable or uncorrectable error has been detected by circuitry 14. The output signals may optionally be written back to the selected frame if a correctable error is detected. Processing may loop back to step 158 if there are additional memory bits (frames) to be corrected, as indicated by path 174.

Once every frame has been scanned, device 10 may be place in normal operation (step 176). Error detection circuitry 14 may be used to continuously monitor the memory bits stored in device 10 during its lifetime, if desired.

The foregoing is merely illustrative of the principles of this invention and various modifications can be made by those skilled in the art without departing from the scope and spirit of the invention.

What is claimed is:

1. An integrated circuit, comprising:
   a plurality of memory elements;
   error detection circuitry coupled to the plurality of memory elements, wherein the error detection circuitry is coupled to the memory elements using data bit lines that carry data bits and check bit lines that carry check bits, wherein the check bit lines are interspersed throughout the data bit lines, and wherein the error detection circuitry comprises encoder circuitry that receives the data bits at an input, that provides the data bits to the data bit lines, and that includes an encoder that generates the check bits for the check bit lines based on the received data bits; and
   a respective multiplexer having a first input that receives the check bits from the encoder circuitry, a second input that receives a respective one of the data bits, and an output that is coupled to a corresponding check bit line of the check bit lines.

2. The integrated circuit defined in claim 1 wherein the encoder comprises a plurality of exclusive OR gates.

3. The integrated circuit defined in claim 1 further comprising:
   an input register having a plurality of input lines and a plurality of output lines, wherein the encoder circuitry receives the data bits from the plurality of output lines of the input register.

4. The integrated circuit defined in claim 3 wherein the encoder comprises a plurality of cascaded two-input exclusive OR gates.

5. The integrated circuit defined in claim 1 wherein the error detection circuitry is operable in a pipelined mode and in a non-pipelined mode.

6. An integrated circuit, comprising:
   a plurality of memory elements;

error detection circuitry that has an error detection signal output; and a plurality of lines coupled between the memory elements and the error detection circuitry that convey data bits and check bits from the memory elements to the error detection circuitry, wherein the error detection circuitry generates error signals based on the data bits and check bits, wherein the error signals indicate whether a detected error is correctable, wherein the error detection circuitry is operable in a pipelined mode and in a non-pipelined mode, and wherein the error detection circuitry is configured to receive the data bits from the memory elements when the error detection circuitry is in the non-pipelined mode and when the error detection circuitry is in the pipelined mode.

7. The integrated circuit defined in claim 6 wherein the error detection signal output includes a first line that carries an error bit indicative of whether any soft errors are present in the plurality of memory elements.

8. The integrated circuit defined in claim 7 wherein the error detection signal output includes a second line that carries an additional error bit indicative of whether a soft error that is associated with the error bit is correctable.

9. The integrated circuit defined in claim 6 wherein the error detection circuitry comprises:

an encoder that receives the data bits and the check bits from the plurality of lines; and a plurality of syndrome decoders coupled to the encoder.

10. The integrated circuit defined in claim 9 further comprising a path that carries syndrome bits from the encoder to the plurality of syndrome decoders.

11. The integrated circuit defined in claim 10 wherein the error detection circuitry further comprises error generation circuitry that receives the syndrome bits from the encoder and that receives output signals from the plurality of syndrome decoders.

12. The integrated circuit defined in claim 11 wherein the error generation circuitry comprises a logic gate that receives the syndrome bits and that produces an error bit indicative of whether any soft errors are present in the plurality of memory elements.

13. The integrated circuit defined in claim 9 further comprising a plurality of logic gates that receives the syndrome bits from the plurality of syndrome decoders, that receives the data bits from at least some of the plurality of lines, and that outputs a corrected version of the data bits.

14. The integrated circuit defined in claim 13 wherein each syndrome decoder comprises logic circuitry that receives product terms from within that syndrome decoder and product terms from an adjacent one of the plurality of syndrome decoders.

15. A method of operating an integrated circuit having a plurality of memory elements and error detection circuitry that is coupled to the plurality of memory elements, comprising:

with the error detection circuitry, supplying data bits to the plurality of memory elements via data bit lines and supplying check bits to the plurality of memory elements via check bit lines, wherein the check bit lines are interleaved with the data bit lines;

with the error detection circuitry, detecting and correcting adjacent multi-bit errors in a selected row of memory elements, wherein the error detection circuitry is operable in a pipelined mode and a non-pipelined mode and wherein the error detection circuitry includes a pipeline register;

while the error detection circuitry is placed in the pipelined mode, receiving data from the plurality of memory elements using the pipeline register; and while the error detection circuitry is placed in the non-pipelined mode, bypassing the pipeline register.

16. The method defined in claim 15, wherein the plurality of memory elements are arranged in rows and columns, the method further comprising:

with the error detection circuitry, detecting and correcting single-bit errors in the selected row of memory elements and detecting adjacent triple-bit errors in the selected row of memory elements.

\* \* \* \* \*